United States Patent

[11] 3,541,964

| [72] | Inventor | Arney J. Harbert<br>Denver, Colorado |
|---|---|---|
| [21] | Appl. No. | 702,953 |
| [22] | Filed | Feb. 5, 1968 |
| [45] | Patented | Nov. 24, 1970 |
| [73] | Assignee | Transportation Systems, Inc.<br>Boulder, Colo.,<br>a corporation of Colorado |

[54] PRETENSIONED ELEVATED TRACK AND CABLE STRUCTURE
15 Claims, 8 Drawing Figs.

[52] U.S. Cl. .................................................. 104/91,
104/123
[51] Int. Cl. .................................................. B61b 3/02
[50] Field of Search .......................................... 104/89, 90,
91—94, 123, 124, 125; 14/17, 18, 19

[56] References Cited
UNITED STATES PATENTS

| 3,055,484 | 9/1962 | Hubert ........................ | 14/18X |
| 3,114,161 | 12/1963 | Colombot ................... | 14/18 |
| 3,132,363 | 5/1964 | Roberts ....................... | 14/18 |

FOREIGN PATENTS

| 943,231 | 5/1956 | Germany ..................... | 104/89 |

*Primary Examiner*—Trygve M. Blix
*Attorney*—John E. Reilly

ABSTRACT: In an aerial transportation system, an elevated track adapted for overhead suspension and advancement of a vehicle is supported between towers by a cable structure having transverse suspender elements interconnecting the main supporting cables and track under a predetermined degree of tension in such a way as to stabilize the track, to compensate for temperature changes and greatly increase the track span between supporting towers.

Patented Nov. 24, 1970
3,541,964
Sheet 1 of 3
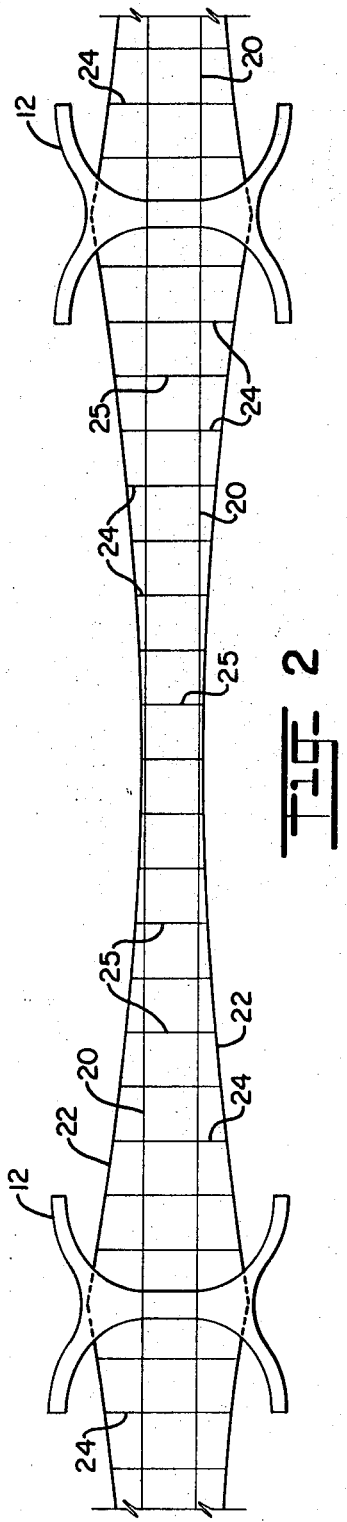
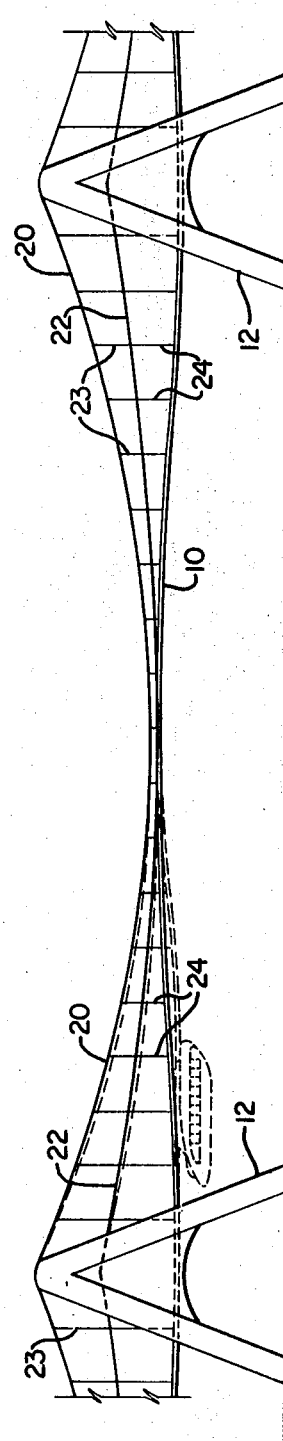
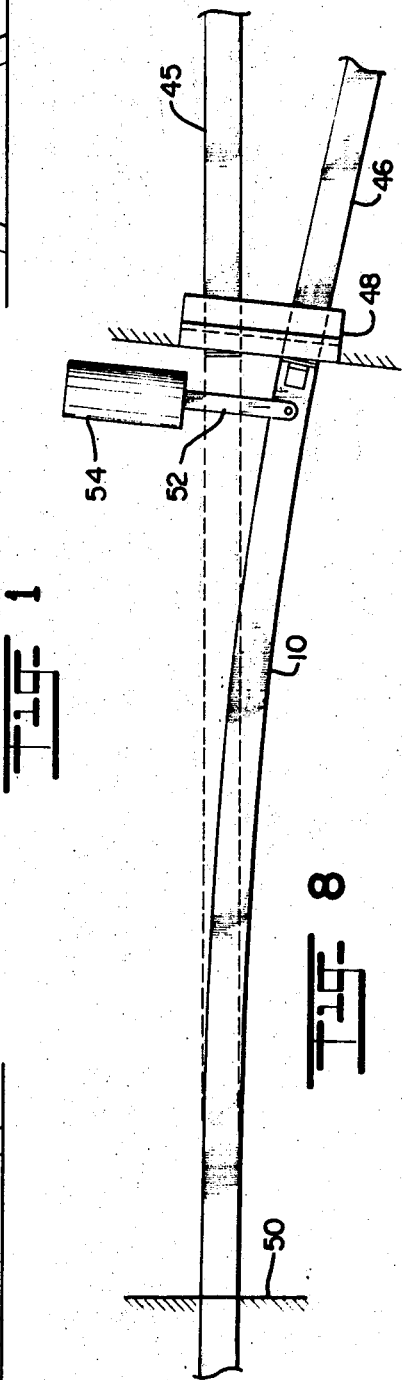
INVENTOR
ARNEY J. HARBERT
BY John E. Reilly
ATTORNEY

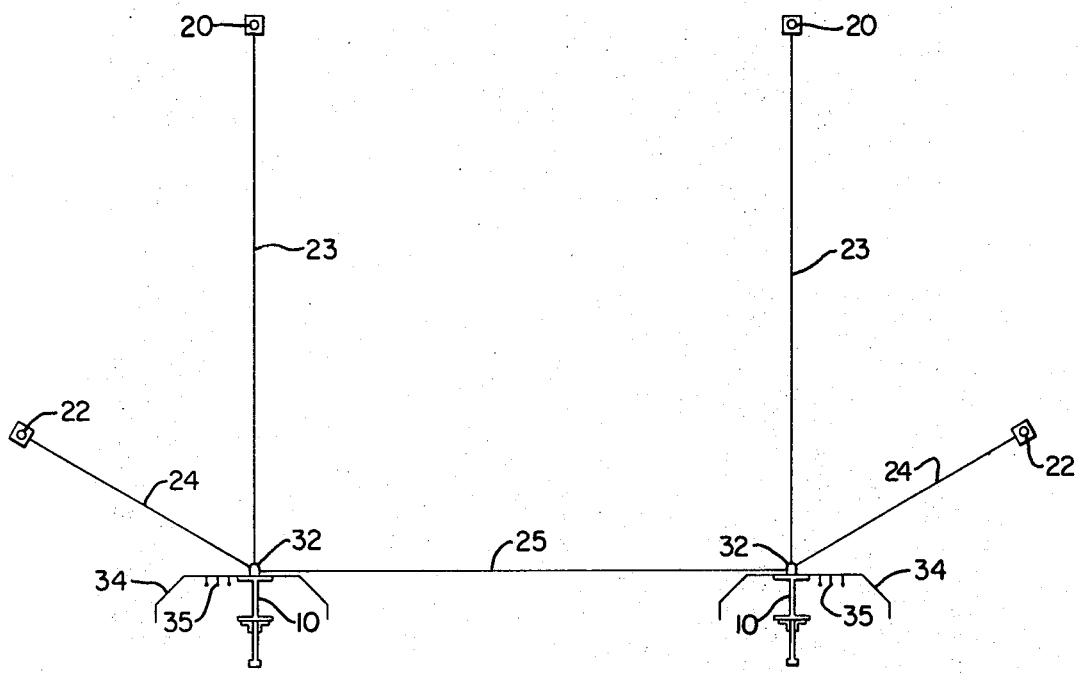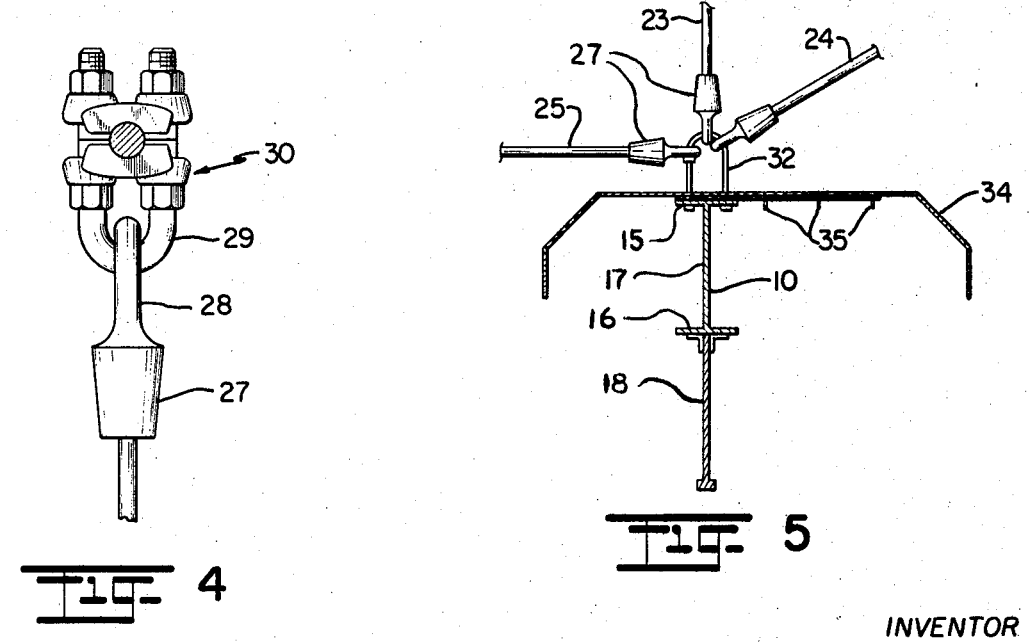

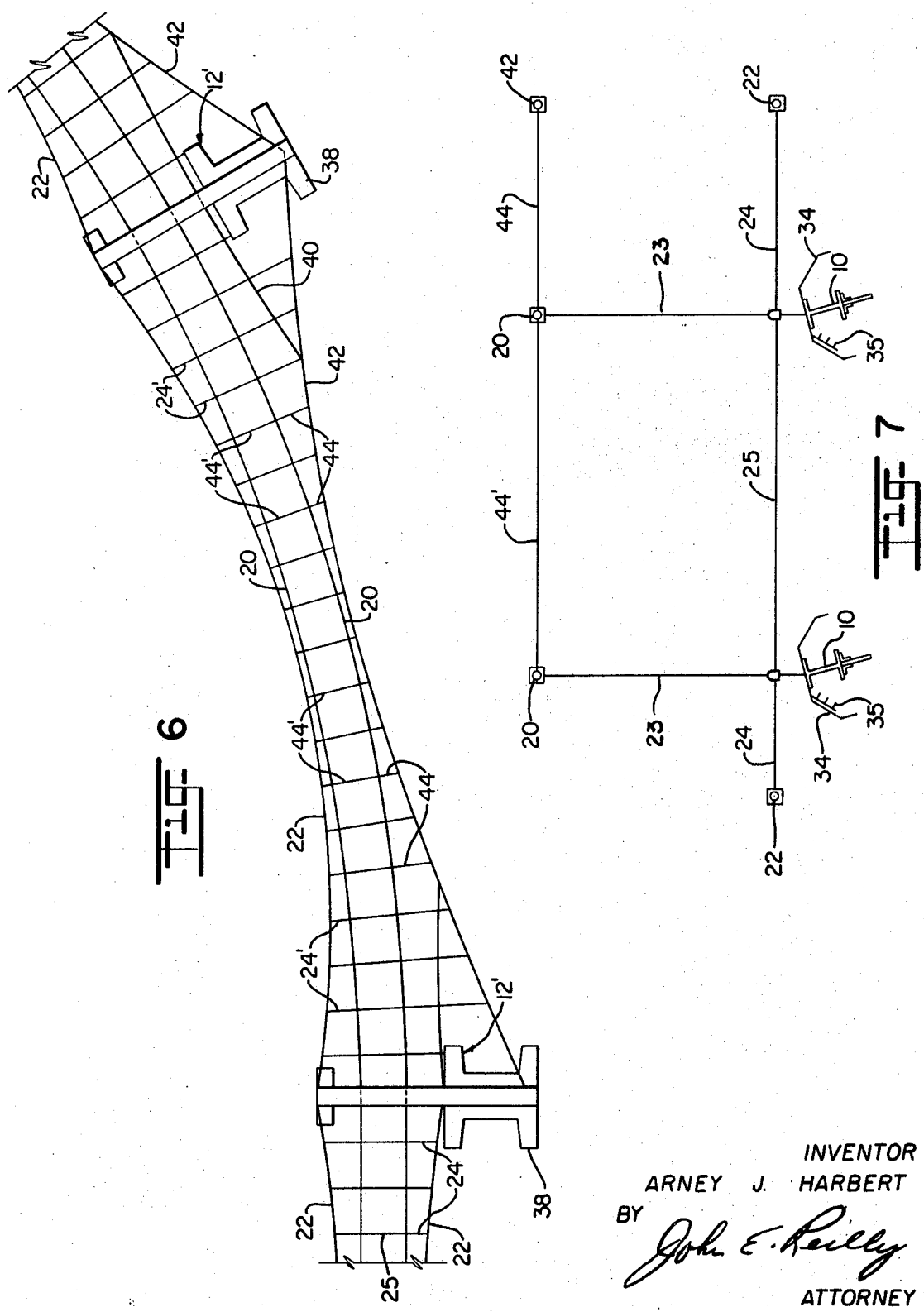

PRETENSIONED ELEVATED TRACK AND CABLE STRUCTURE

This invention generally relates to aerial transportation systems, and more particularly relates to a novel and improved elevated track and supporting cable structure for a vehicle.

When a vehicle is suspended for travel along an elevated track, the track system must possess the necessary strength and stability to withstand external forces, such as, the load of the vehicle, and to resist any tendency of the vehicle to undergo any objectionable swaying or shifting over a wide range in speeds; yet the system must possess the necessary flexibility to follow both vertical and horizontal curves and to permit switching from one track to another. Track systems presently in use are relatively high in cost of construction and maintenance particularly in traversing extended distances, and a major item of cost has been that of installation, particularly of the supporting towers. It is therefore desirable to devise an elevated track system which is relatively low in cost and is characterized by its improved stability and conformability for use along uneven terrain including mountainous or hilly areas. More specifically, the elevated track system devised according to the present invention includes a unique cable supporting structure for the track which has optimum stability while substantially reducing the number of supporting towers required to support the track over a given distance.

It is therefore an object of the present invention to provide for a novel and improved elevated track and cable supporting structure having optimum static and dynamic stability in supporting heavy vehicle loads both for low speed and high speed travel along straight or curved sections.

It is another object of the present invention to provide for a pretensioned track and cable space structure in an aerial transportation system which is low in cost, inexpensive to maintain, and is readily adaptable for a short or long distance transportation.

It is further object of the present invention to provide in an elevated track system for a novel and improved means of suspension of the track which greatly increases the span length between supporting towers, is self-dampening and utilizes the geometry of the structure in resisting loads.

In accordance with the present invention, an elevated track is suspended under tension between widely spaced supporting towers by a cable supporting structure having main supporting cables extending between the towers and transverse suspender elements between the cable and track members. The cable and track members are so interconnected as to effectively dampen vibrations resulting from externally applied loads, and the cable structure introduces sufficient tension to deflect the track upwardly into a cambered position. As a result, the track will be lowered, under the load of an approaching vehicle, into a substantially level disposition and in this way is self-compensating for changes in temperature, since the track will never be entirely relieved of tension. Specifically, the main supporting cables may be comprised of vertical and horizontal stabilizer cables and, in cooperation with struts which maintain the desired spacing between a pair of tracks, will lend the necessary stability to the system to resist wind and other external forces. Still further, in following horizontal or vertical curves, supplementary stabilizing cables may be installed and pretensioned to develop the necessary tension in the cables, struts and suspenders whereby to result in a self-dampening structural system having optimum static and dynamic stability.

The above and other objects, advantages and features of the present invention will become more readily understood and appreciated from a consideration of the following detailed description when taken together with the accompanying drawings, in which:

FIG. 1 is an elevational view illustrating a straight section of an elevated track and cable space system in accordance with the present invention.

FIG. 2 is a plan view of the section shown in FIG. 1.

FIG. 3 is a cross-sectional view schematically illustrating the relationship between the cable and track at the quarter point along the span.

FIG. 4 is a view in detail of one form of connection between the cable and suspender elements.

FIG. 5 is a view in detail of one form of connection between the suspender and track members.

FIG. 6 is a plan view of a curved section of the track and cable system.

FIG. 7 is an enlarged cross-sectional schematic view of the curved section shown in FIG. 6 taken at the midsection of the span; and FIG. 8 is a schematic illustration of a switching unit for the track.

Referring to in detail to the drawings, there is shown in FIGS. 1 and 2 a span of an aerial transportation system in which a vehicle is guided for travel along an elevated track 10, the track being supported at spaced intervals by suitable supporting towers 12 and being suspended along the span between supporting towers by a cable supporting structure to be hereinafter described. While one or more tracks may be utilized, a pair of tracks 10 are shown in the drawings as being arranged in horizontally spaced, parallel relation to one another for travel of the vehicle in opposite directions from terminal points at opposite ends of the track. Merely for the purpose of illustration but not limitation, the tracks shown in the preferred form of invention are designed for overhead suspension of a vehicle having a linear induction motor drive; and, for this purpose, each track is in the form of an I-shaped rail or beam having upper and lower horizontal flanges 15 and 16 interconnected by a vertical web section 17 with an electrical stator plate 18 depending downwardly from the lower horizontal flange and extending continuously along the undersurface of each track to guide and advance the vehicle.

Along the straight and vertical curved sections of the track, the cable supporting structure comprises for each track a first support cable or stringer 20 spaced vertically above the track and a second horizontally stability cable 22 being spaced outwardly and somewhat angularly above each respective track. In order to apply a predetermined amount of tension between each track and support cable 20, suspender elements 23 extend transversely at longitudinally spaced intervals between the cable 20 and track, each suspender preferably being in the form of a cable member which is dimensioned at each point along the track to be of a specified length and strength necessary to maintain the desired tension and spacing between the cable and track members. As shown, the suspender elements 23 along each span are arranged at unevenly spaced intervals and are dimensioned to draw the cable 20 and the track 10 progressively closer together from opposite ends of the span adjacent to the towers toward the center of the span and to deflect the track upwardly under a sufficient degree of tension that the track will assume a predetermined camber or upward curvature reverse to the downward curvature of the cable.

In a similar fashion, transverse suspender elements 24 are arranged for extension at unevenly spaced intervals between a horizontal stability cable and each track 10, the suspender elements 24 also being dimensioned in length to maintain a predetermined tension and spacing between the horizontal stability cable and associated track 10 whereby to resist lateral deflection of the track members. In this relation it will be observed that the horizontal stability cables 22, being arranged on opposite sides of the spaced parallel tracks 10, will act substantially in equal and opposite direction to resist lateral deflection of the track members. Of course, in utilizing a single track member it may be desirable or necessary to provide a horizontal stability cable connected by suspender elements along opposite sides of the single track. In the preferred form, struts 25 in the form of cable strands extend transversely to establish a predetermined spacing between the tracks which will resist lateral deflection of the tracks under the tensional force of the horizontal stability cables 22 and suspender elements 24 as well as external forces applied to the track members.

FIGS. 3 to 5 illustrate suitable means of interconnection between the cable, suspender and track members. For instance, referring to FIGS. 4 and 5, the suspender elements 23 and 24 are connected at their upper ends to cables 20 and 22, respectively, by closed socket member 27 each having an eye bolt 28 on its terminal end for insertion of a U-bolt 29 forming part of a cable cal clamp assembly 30. Here the cable clamp is of conventional construction and is lockingly clamped on the cable 20 in order to prevent shifting or displacement of the suspender with respect to the cable. Similarly, the lower terminal ends of the suspender elements 23 and 24, as well as opposite ends of the struts 25 are provided with closed sockets 27 having terminal eye bolts through which are inserted a common U-bolt 32, the latter having its free ends projecting downwardly through the upper flange 15 of the track and securely bolted thereto, as illustrated in FIG. 5. MOreover, a protective hood 34 provided with electrical conducters 35 may be secured by each of the U-bolts 32 to the upper surface of the upper flange portion 15 of each track. If desired, locking nuts can be positioned on the inside of each U-bolt to limit downward displacement or movement of the end of each strut 25 but most desirably the suspender elements 23 and 24 are free to undergo a limited amount of lateral displacement at their connecting ends.

The construction and arrangement of the cable supporting structure as shown in FIGS. 1 to 5 will generally obtain for the straight and vertically curved sections of the track, save that the spacing between the towers 12 may be greater along steeper vertical curves than along straightaway sections in order to lend additional rigidity and strength to the track structure. However, additional considerations are involved in the formation of horizontally curved sections of the track in order to lend additional stability and support both to the rail or track sections and to the main supporting cables. Thus, as seen from FIGS. 6 and 7, the towers 12' include an outward lateral extension 38 to support the terminal ends of the outside horizontal stabilizing cables 22 whereby to permit increased lateral spacing of the cables 22' outwardly of the track sections. In addition, auxiliary cables 40 subtend connecting ends of adjacent cable members 20 across each tower, and each auxiliary cable 40 is clamped at opposite ends to the stabilizing cable under sufficient tension to equalize the lateral stability of the track system adjacent to the supporting towers. In order to lend further support to the horizontal structure of the main supporting cables 20, an auxiliary support cable 42 is disposed in outer, horizontally spaced relation to the upper supporting cable 20 with suspender elements 44 extending transversely between the cables 20 and 42 and intermediate suspenders 44' extending between the cables 20, the suspenders 44 and 44' being disposed at spaced intervals along the span under a predetermined amount of tension to support the desired horizontal curvature both of the main support cables and of the tracks. As before, a single inside horizontal stabilizing cable 22 traverses the span of each track section between the towers to resist the centrifugal force of the vehicle as it is advanced along the curved section.

As a modification from the arrangement shown in FIGS. 1 and 2, however, it will be noted that the cables 22 are more in the horizontal plane of the track members, not angularly above the tracks as provided along the straight section. Either form may be adopted according to the degree of lateral and vertical stability required in each section, bearing in mind that the cables will drape or sag between supporting towers.

In the curved section illustrated in FIGS. 6 and 7, the horizontal stability cables 22 are installed and pretensioned in such a way as to develop the desired degree of tension in the struts 25 and in the cable suspender elements 23 and 24 when attached in place. This tensioning along with the opposing curvature of the cables maintains the desired radius of curvature and stability in the track section under heavy loading and externally applied forces. In this relation, the tracks may be banked as illustrated in FIG. 7 to permit the vehicles to follow the curve more easily.

In FIG. 8 there is schematically shown one suitable form of switch assembly to effect lateral deflection of the end of a track section 12 for switching between branch lines 45 and 46. Here the upper flanged portions of the branch lines 45 and 46 may be fixed in horizontally spaced relation to one another by a supporting structure represented at 48 which may form part of a tower 12. In turn, the switch may have a cylinder rod 52 controlled by a cylinder 54 and being either electrically or hydraulically actuated to deflect or switch the track from one branch line to another as shown. The track section 10 at some predetermined sit distance ahead of the movable end portion should be rigidly secured to another supporting tower, or a separate supporting structure represented at 50.

When the track and cable system is installed, preferably each length of track is laid in sections and welded together after the cables 20 and 22 have been strung under tension between the support towers 12 and the suspenders attached thereto. The track sections can be jacked up or hoisted into position for attachment of the lower ends of the suspenders so that when the track is released it will be held under tension in the cambered position by the cable and suspender elements, and the strength of each cable and suspender should approximate that of the track so that the tensional force applied is uniformly distributed throughout the system. As a suitable alternative, other procedures may be followed either in pretensioning or post-tensioning the track and cable together, such as for instance, by and connecting the track, cable and suspender elements between the towers and thereafter drawing the ends of the main support and stability cables in opposite directions under sufficient force to post-tension the entire structure. Also, the cables and suspenders may be adjustable in length to regulate the tension by turn buckles or by adjustable end connecting members for each cable or suspender. In a typical installation wherein the span between towers is on the order of 1,500 feet, the vertical deflection of the track may approximate 8 to 10 feet at its center and the vertical drape of the support and stability cables more on the order of 40 feet. Of course the span or distance between towers will vary along the curved and straight sections of the track and be largely governed by the strength of the track and cable members as well as the weight of the vehicle loads to be carried.

An additional feature of the track and cable space structure of the present invention resides in its self-dampening characteristics. The track and cable members should be checked to insure that each has a different natural frequency which will, when excited by externally applied dynamic loads, such as, those introduced by the vehicles or by wind forces, tend to dampen the vibrations introduced and avoid development of resonant frequencies which could otherwise be destructive to the system. The self-dampening characteristics of the track and cable structure is further aided by uneven spacing of the suspenders 23 and 24 and strut members 25 along each span of track. In this connection, the vibrational frequencies of the track and cable members should differ from the fundamental frequency of the vehicle so as to prevent development of resonant frequencies. When the track is installed, tensioned and cambered in the manner described, it also possesses the ability to expand or contract under temperature changes without being entirely relieved of the the tension introduced by the cable and suspender elements and avoids the necessity of expansion joints. Further, the track, in acting as a beam between the suspender elements and when loaded with the vehicle, will drop downwardly toward a relatively flat or level configuration, as shown dotted in FIG. 1, but will never have its upper flange in compression and thus minimize undesirable swaying without additional means of lateral support other than the horizontal stability cable.

From the foregoing, static and dynamic stability is achieved through the proper combination of track, support cable and stabilizer cable tension to give the vehicle mass the proper level of reaction and provide maximum passenger comfort over a wide range in speed. At relatively low speeds the vehicle will depend to a considerable extent upon the supporting structure to resist lateral gust loads. At higher speeds lateral stability may be supplemented by the use of aerodynamic control surfaces on the vehicle, and it is desirable to free the track of lateral restraint under high speed operation so as to avoid opposing reaction forces. For low and high speed travel, however, the track, support cable and stabilizer tension will contribute to provide an extremely high restoring force in opposition to any vertical or lateral deflection of the track as well as develop maximum damping of undesirable vibrations introduced by externally applied forces. Summarizing the many advantages and features of the present invention, the pretensioned cable and track structure of the present invention provides optimum riding qualities for a vehicle by virtue of its self-dampening and stability characteristics while being of low cost construction permitting increased spacing between the supporting towers over straight or curved paths of travel. Nevertheless, the cost of construction and of maintenance is minimized while providing the necessary stability for low or high speed travel.

It will be evident that the particular manner and means of interconnection between the suspender elements, cable and track may be varied as well as the specific manner of mounting and composition of materials constituting the suspender and strut elements while achieving the same desired objectives, although the specific form described herein is considered to be the best mode of practice of the present invention. It is therefore to be understood that various other modifications and changes may be made in the particular composition, construction and arrangement of elements and parts comprising the present invention.

I claim:

1. In an aerial transportation system, an elevated track structure comprising:
   at least one longitudinally extending vehicle-carrying track;
   a series of supporting towers arranged at longitudinally spaced intervals along said track for supporting said track in an elevated position; and
   track suspension means spanning said towers above said track including transverse suspension members connected to said track under a predetermined amount of tension to deflect said track upwardly into camber position between said supporting towers.

2. In an aerial transportation system according to claim 1, said track suspension means further including support cables extending longitudinally in spaced relation above said track, said transverse suspension members extending vertically between said cables and said track, and said track suspension means and said track having different natural frequencies to dampen vibration introduced into the system.

3. In an aerial transportation system according to claim 2, said support cables including upper main supporting cables vertically spaced above said track and outer horizontal stability cables on opposite sides of said track.

4. In an aerial transportation system according to claim 3 said horizontal stability cables spaced above the horizontal plane of said track and said transverse suspension members extending angularly between said horizontal stability cables and said track and vertically between said main support cables and said track.

5. In an aerial transportation system according to claim 3, wherein said track includes a horizontally curved section, and said track suspension means further includes an upper horizontal support cable in horizontally spaced relation to said main support cable outwardly of the curved section of said track, and transverse suspension members interconnecting said upper horizontal support cable and main support cable under tension.

6. In an aerial transportation system according to claim 5, wherein said track suspension means further includes an auxiliary cable extending across a supporting tower between adjacent ends of the upper horizontal supporting cables along the curved section of said track.

7. In an aerial transportation system, an elevated track structure comprising a pair of longitudinally extending vehicle-carrying rails arranged in horizontally spaced, parallel relation to one another,
   strut members extending transversely between said rails,
   supporting columns at longitudinally spaced intervals for supporting said rails in elevated position, and
   a pretensioned cable structure spanning said columns above said rails, said cable structure including transverse suspension members connected under tension to said rails whereby to deflect said rails upwardly into cambered position between said supporting columns.

8. In an aerial transportation system according to claim 7, said cable structure including a main support cable extending in vertically spaced relation above each of said rails and said transversely extending suspension members interconnecting each of said vertically spaced cables and rails under tension.

9. In an aerial transportation system according to claim 8, said cable structure further including a horizontal stability cable disposed outwardly of and in space relation above each of said rails, and transversely extending suspension members interconnecting said horizontal stability cables and said rails under tension.

10. In an aerial transportation system according to claim 7, each of said cable and rail members having a different vibrational frequency, each of said suspender elements having a vibrational frequency differing from that of said cables and said rails.

11. In an aerial transportation system according to claim 7, said rails being deflected upwardly under a sufficient degree of tension to resist vertical downward deflection of said rails beneath a level position under the weight of the vehicle.

12. In an aerial transportation system according to claim 8, said transversely extending suspension members being unevenly spaced along the length of said track structure between supporting columns.

13. In an aerial transportation system according to claim 7, said strut and suspender members each being in the form of cables, said strut and suspender cables being unevenly spaced between supporting towers.

14. In an aerial transportation system according to claim 13, further including connecting elements at spaced intervals along the upper surface of each rail for interconnecting adjacent ends of alined strut and suspender members to each rail.

15. In an aerial transportation system according to claim 14 wherein said track structure includes a horizontally curved section, and said track suspension means further includes an upper horizontal support cable in horizontally spaced relation to said main support cable outwardly of the curved section of said track, and transverse suspension members interconnecting said upper horizontal support cable and main support cable under tension.

PO-1050
(5/69)

UNITED STATES PATENT OFFICE
CERTIFICATE OF CORRECTION

Patent No. 3,541,964                    Dated    24 November 1970

Inventor(s) Harbert, Arney J.

It is certified that error appears in the above-identified patent and that said Letters Patent are hereby corrected as shown below:

Col. 2, line 12, delete "to" (first occurrence)
        line 36, cancel "horizontally" and substitute
            -- horizontal --.
        line 47, delete "the" (second occurrence)

Col. 3, line 1, after "to", insert -- the --.
        line 4, after "cable" (first occurrence), de-
            delete -- cal --.

Col. 4, line 8, after "predetermined", cancel "sit"
        line 25, after "by", insert -- laying --.
        line 58, cancel "the" (first occurrence).

Col. 5, Claim 1, line 39, cancel "camber" and substitute
            -- cambered --.

Col. 6, Claim 14, line 52, cancel "alined" and substitut
            -- aligned --.

Signed and sealed this 18th day of April 1972.

(SEAL)
Attest:

EDWARD M. FLETCHER, JR.
Attesting Officer

ROBERT GOTTSCHALK
Commissioner of Patents